(12) United States Patent (10) Patent No.: US 9,003,782 B2
Werni et al. (45) Date of Patent: Apr. 14, 2015

(54) EXHAUST GAS-TREATING DEVICE

(71) Applicant: Eberspächer Exhaust Technology GmbH & Co. KG, Neunkirchen (DE)

(72) Inventors: Marcus Werni, Waiblingen (DE); Rainer Lehnen, Eberspach (DE)

(73) Assignees: Eberspächer Exhaust Technology GmbH & Co. KG, Neunkirchen (DE); Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/092,311

(22) Filed: Nov. 27, 2013

(65) Prior Publication Data

US 2014/0086802 A1 Mar. 27, 2014

Related U.S. Application Data

(63) Continuation of application No. 12/731,432, filed on Mar. 25, 2010, now Pat. No. 8,621,853.

(30) Foreign Application Priority Data

Mar. 26, 2009 (DE) .......................... 10 2009 014 435

(51) Int. Cl.
| | |
|---|---|
| *F01N 3/10* | (2006.01) |
| *F01N 3/28* | (2006.01) |
| *F01N 3/021* | (2006.01) |
| *F01N 3/20* | (2006.01) |
| *F01N 13/18* | (2010.01) |
| *F01N 3/08* | (2006.01) |
| *F01N 13/00* | (2010.01) |
| *F01N 1/08* | (2006.01) |

(52) U.S. Cl.
CPC ............ *F01N 3/2892* (2013.01); *F01N 3/0211* (2013.01); *F01N 3/2066* (2013.01); *F01N 3/28* (2013.01); *F01N 13/1838* (2013.01); *F01N 3/08* (2013.01); *F01N 3/2882* (2013.01); *F01N 13/0097* (2014.06); *F01N 1/084* (2013.01); *F01N 2450/30* (2013.01); *F01N 2470/22* (2013.01); *Y02T 10/24* (2013.01)

(58) Field of Classification Search
CPC ..... F01N 3/2066; F01N 3/28; F01N 13/1838; F01N 13/0097
USPC .............................. 60/297, 299, 311; 422/169
See application file for complete search history.

(56) References Cited

U.S. PATENT DOCUMENTS 6,393,835 B1 * 5/2002 Stoll et al. ........................ 60/299
2002/0023435 A1 * 2/2002 Woerner et al. .................. 60/297

(Continued)

*Primary Examiner* — Jason Shanske
(74) *Attorney, Agent, or Firm* — McGlew and Tuttle, P.C.

(57) ABSTRACT

An exhaust gas-treating device (1) for an exhaust system of an internal combustion engine, especially of a motor vehicle, has a housing (2), which has a jacket (3) extending circumferentially on the side and two end-side end bottoms (4, 5). Maintenance is simplified with at least one mounting tube (6), which passes through one or the first end bottom (4) and into the outlet end (8) of which a particle filter (7) is plugged axially from the outside, with a deflecting housing (9). The deflecting housing (9) contains a deflecting chamber (10), and has at least one inlet (11) communicating with the deflecting chamber (10) and at least one outlet (12) communicating with the deflecting chamber (10). A fastening device (13) is provided for detachably fastening the respective inlet (11) at the respective outlet end (8) of the mounting tube (6).

8 Claims, 12 Drawing Sheets

(56) References Cited

U.S. PATENT DOCUMENTS

| | | | |
|---|---|---|---|
| 2003/0221424 A1* | 12/2003 | Woerner et al. | 60/297 |
| 2004/0003963 A1* | 1/2004 | Worner et al. | 181/239 |
| 2006/0156712 A1* | 7/2006 | Buhmann et al. | 60/297 |
| 2006/0266022 A1* | 11/2006 | Woerner et al. | 60/295 |
| 2007/0289294 A1* | 12/2007 | Werni et al. | 60/299 |

* cited by examiner

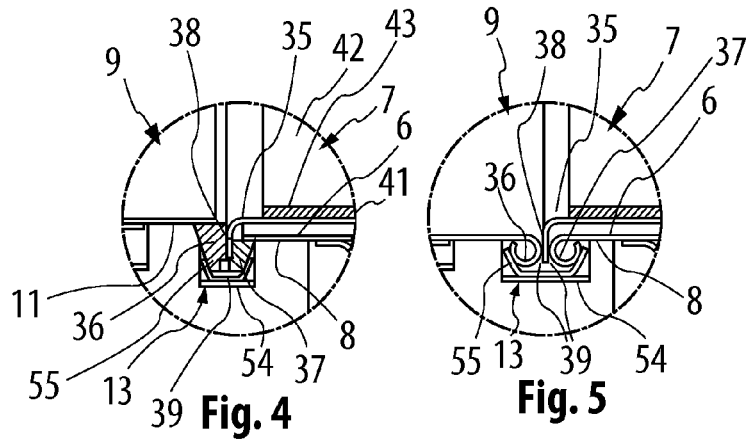
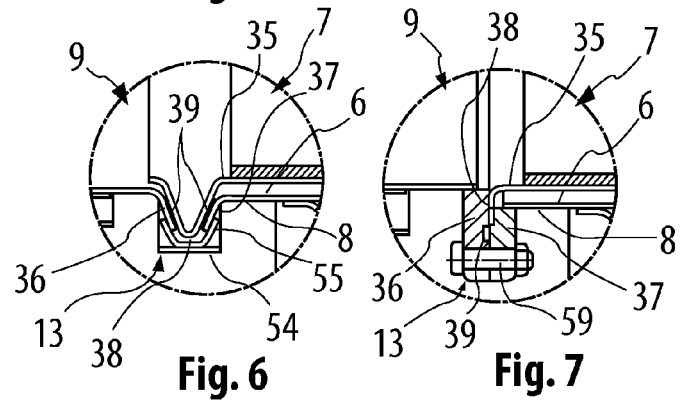

EXHAUST GAS-TREATING DEVICE

CROSS REFERENCE TO RELATED APPLICATIONS

This is a continuation under 37 CFR 1.53(b) of pending prior application Ser. No. 12/731,432, filed Mar. 25, 2010, and claims the benefit of priority under 35 U.S.C. §119 of German Patent Application DE 10 2009 014 435.8 filed Mar. 26, 2009, the entire contents of each of the applications are incorporated herein by reference.

FIELD OF THE INVENTION

The present invention pertains to an exhaust gas-treating device for an exhaust system of an internal combustion engine, especially of a motor vehicle.

BACKGROUND OF THE INVENTION

Such an exhaust gas-treating device may contain at least one particle filter in order to filter out particles carried in the exhaust gas, especially soot. The particles filtered out are deposited in a particle filter element of the particle filter. The storage capacity of the particle filter decreases with increasing load, and the flow resistance of the particle filter increases at the same time. Regenerations are correspondingly carried out, during which the particle load is burned off. Since particles that cannot be burned off are also deposited in the particle filter, the particle filter gradually becomes clogged despite regenerations, which reduces the storage capacity of the particle filter and increases the flow resistance thereof. It may therefore be necessary over the intended service life of an internal combustion engine to perform maintenance on or replace the particle filter. It is undesirable in this connection to replace the entire exhaust gas-treating device. It is rather desirable to design the exhaust gas-treating device such that the particle filter or at least the particular particle filter element can be made accessible and replaced with the least possible effort. It is common practice for this to design a housing of the exhaust gas-treating device such that it can be opened. For example, individual components of the housing can be fastened detachably to one another for this purpose. For example, flanged fastenings are conceivable, but this means increased weight as well as a comparatively great manufacturing effort. Plug-in connections are quasi ruled out because these can be detached with very great difficulty only or not at all any more after a long connection time. Clamp connections seem to be best suited.

SUMMARY OF THE INVENTION

The present invention pertains to the object of providing an improved embodiment for an exhaust gas-treating device of the type mentioned in the introduction, which is characterized especially by simple handling for changing the particle filter.

The present invention is based on the general idea of installing at least one mounting tube in the housing of the exhaust gas-treating device, which said mounting tube passes through an end bottom of the especially barrel-shaped housing. A particle filter can be subsequently inserted into the mounting tube axially without the housing itself having to be opened. In addition, the exhaust gas-treating device is equipped with a deflecting housing, which deflects in the mounted state the exhaust gas flow leaving the particle filter or the mounting tube in a deflecting chamber contained therein to an inlet of the housing, which inlet likewise passes through said end bottom of the housing. The exhaust gas can thus be led out of the housing proper of the exhaust gas-treating device through the external deflecting housing, deflected and introduced again. A further treatment of the exhaust gas may subsequently optionally follow in the interior of the housing of the exhaust gas-treating device. The deflecting housing is detachably attached to the housing by means of at least one fastening means. The respective fastening means detachably connects at least one inlet of the deflecting housing to an outlet end of the mounting tube.

The mode of construction being proposed creates sufficient access to the particle filter for maintenance purposes without the housing itself having to be opened for this. The detachable attachment of such a deflecting housing is comparatively simple and inexpensive.

Corresponding to an advantageous embodiment, an outlet-side end section of the particle filter, which faces the deflecting housing, may be designed such that it can be integrated in the fastening means, which is provided for the detachable fastening of the inlet of the deflecting housing at the outlet end of the mounting tube, such that axial fixation of the particle filter at the mounting tube or at the inlet of the deflecting housing is achieved hereby. In other words, the fastening means, which is used to fasten the deflecting housing to the housing of the exhaust gas-treating device, assumes a dual function, because the particle filter inserted into the mounting tube is axially fixed with it at the same time. This facilitates the mounting and removal or replacement of the particle filter, because no separate additional fastening means has to be actuated, which could be intended for the separate fixation of the particle filter.

Corresponding to another advantageous embodiment, an inlet-side end section of the particle filter, which faces away from the deflecting housing, can be radially supported at the mounting tube in an axially displaceable manner. The particle filter can perform relative motions as a result in relation to the mounting tube in the area of its inlet-side end section. This is of increased significance especially in respect to thermal expansion effects. The axially displaceable supporting leads to a movable bearing of the particle filter in or at the mounting tube in the area of the inlet-side end section, while the axial fixation provided at the inlet-side end section of the particle filter quasi forms a fixed bearing between the particle filter and the mounting tube. This combination leads to secure and stable supporting or fixation of the position of the particle filter in the mounting tube and is, moreover, extensively free from thermal stresses.

Corresponding to another advantageous embodiment, provisions may be made for forming the mounting tube by an outlet-side extension of a jacket of an oxidation-type catalytic converter, which is arranged upstream of the particle filter in the housing of the exhaust gas-treating device. The jacket accommodates, moreover, at least one oxidation-type catalytic converter element. The jacket of the oxidation-type catalytic converter thus assumes a dual function, because it accommodates the respective oxidation-type catalytic converter element, on the one hand, while it forms the mounting tube for mounting the particle filter, on the other hand.

It is obvious that the above-mentioned features, which will also be explained below, can be used not only in the particular combination indicated, but in other combinations or alone as well without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is an enlarged view of a detail IV in FIG. 3, showing one clamp connection embodiment of the fastening means;

FIG. 5 is an enlarged view of a detail IV in FIG. 3, showing another clamp connection embodiment of the fastening means;

FIG. 6 is an enlarged view of a detail IV in FIG. 3, showing another clamp connection embodiment of the fastening means;

FIG. 7 is an enlarged view of a detail IV in FIG. 3, showing another embodiment of the fastening means;

FIG. 8 is an enlarged view of a detail VIII from FIG. 3, showing an embodiment for providing axial displaceability;

FIG. 9 is an enlarged view of a detail VIII from FIG. 3, showing another embodiment for providing axial displaceability;

FIG. 10 is an enlarged view of a detail VIII from FIG. 3, showing another embodiment for providing axial displaceability;

FIG. 11 is an enlarged view of a detail VIII from FIG. 3, showing another embodiment for providing axial displaceability;

FIG. 12 is an enlarged view of a detail VIII from FIG. 3, showing another embodiment for providing axial displaceability;

FIG. 13 is an enlarged view of a detail VIII from FIG. 3, showing another embodiment for providing axial displaceability;

DESCRIPTION OF THE PREFERRED EMBODIMENTS

Figure 1:
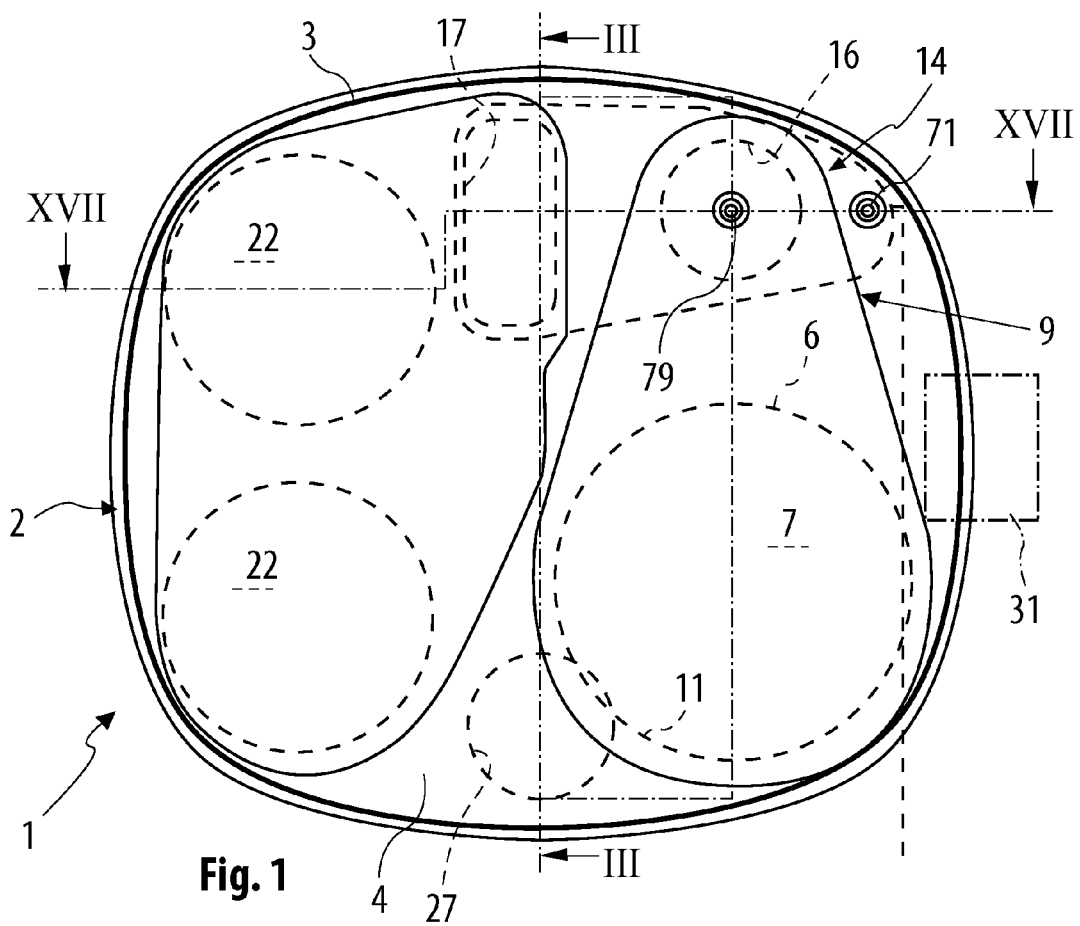
FIG. 1 is an axial view of an exhaust gas-treating device with deflecting housing.

Referring to the drawings in particular, corresponding to FIG. 1, an exhaust gas-treating device 1, which is intended for use in an exhaust system of an internal combustion engine, especially of a motor vehicle, may have a housing, which has a jacket 3 extending laterally circumferentially, as well as two end-side bottoms or end bottoms 4, 5, of which only one or the first end bottom 4 faces the viewer in FIG. 1. The other or second end bottom 5 is arranged at the end of the housing 2 located away from the first end bottom 4.

Figure 2:
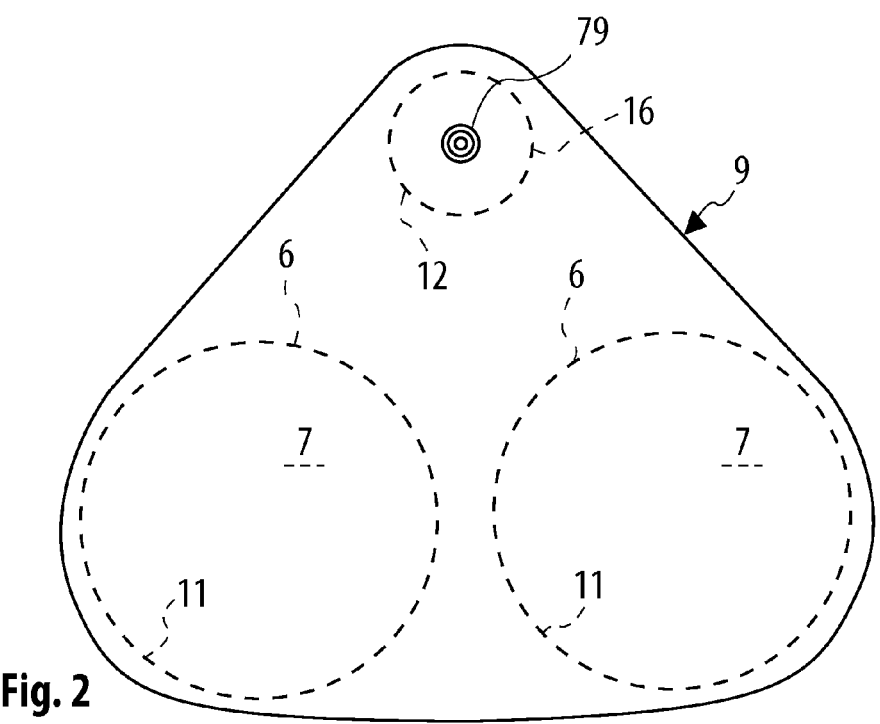
FIG. 2 is an axial view of a deflecting housing of another embodiment.
Figure 3:
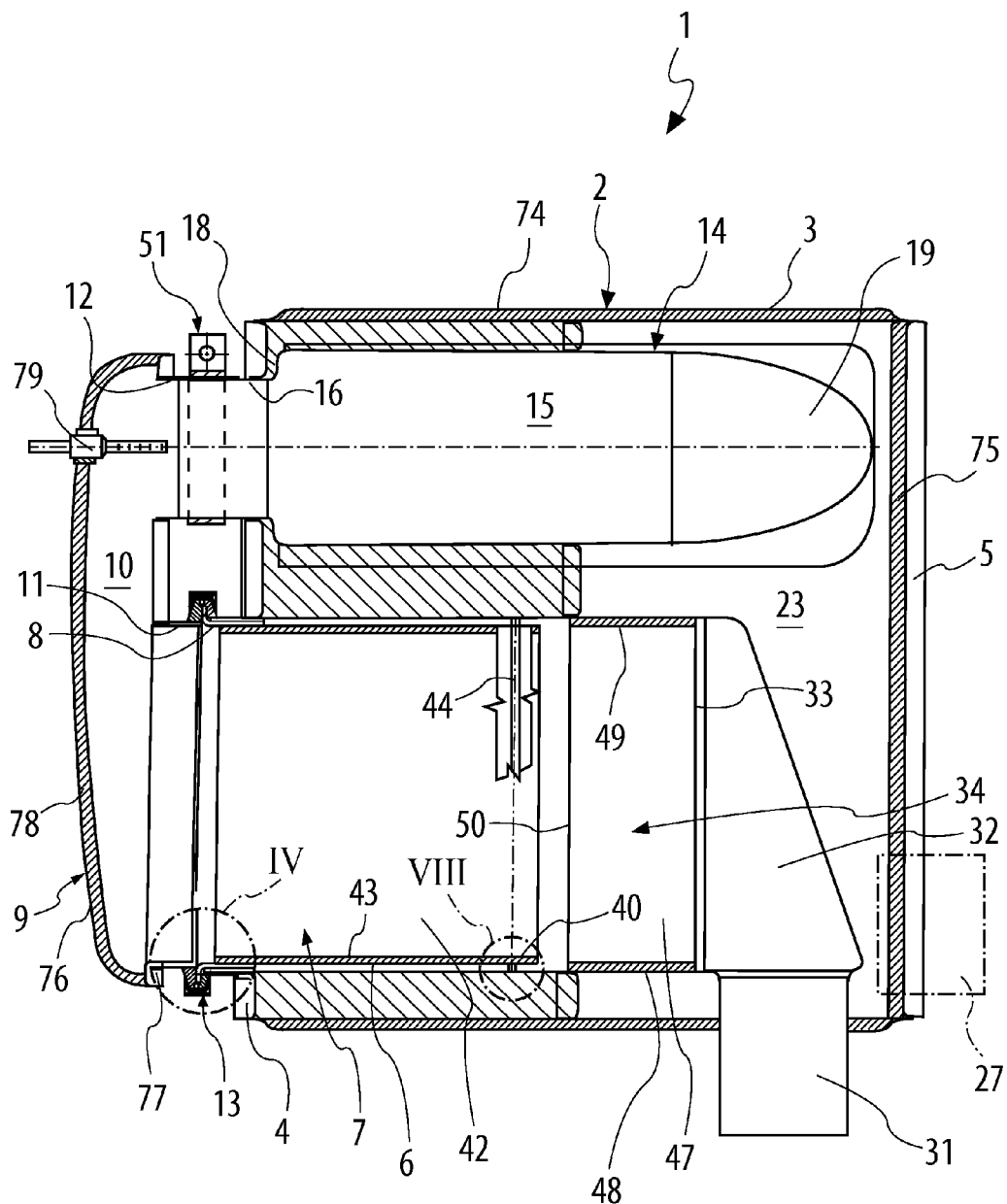
FIG. 3 is a longitudinal section of the exhaust gas-treating device corresponding to the section lines III in FIG. 1.

Corresponding to FIGS. 1-3, the exhaust gas-treating device 1 is preferably equipped with at least one mounting tube 6. Precisely one such mounting tube 6 is provided in the embodiment shown in FIGS. 1 and 3. FIG. 2 shows, purely as an example, an embodiment with two such mounting tubes 6. The respective mounting tube 6 passes axially through the first end bottom 4. Furthermore, the respective mounting tube 6 accommodates a particle filter 7. The respective particle filter 7 is plugged for this into an outlet end 8 of the mounting tube 6, which said outlet end 8 passes through the first end bottom 4, axially and from the outside, i.e., from a side facing away from the interior space 23 of housing 2. Particle filter 7 is arranged now coaxially with the mounting tube 6.

In addition, a deflecting housing 9 is provided in the example. This contains, corresponding to FIG. 3, a deflecting chamber 10. Furthermore, the deflecting housing 9 has at least one inlet 11 communicating with the deflecting chamber 10 as well as at least one outlet 12 communicating with the deflecting chamber 10. The deflecting housing 9 is attached to the housing 2 of the exhaust gas-treating device 1, which can hereinafter also be called main housing 2. At least one fastening means 13, which makes possible the detachable fastening of the respective inlet 11 of the deflecting housing 9 to the respective outlet end 8 of the respective mounting tube 6, is used for this.

In addition or as an alternative, the exhaust gas-treating device 1 being shown here may also have, besides, a mixing housing 14, which is arranged in the main housing 2. Mixing housing 14 contains a mixing chamber 15 and has an inlet 16, which communicates with the mixing chamber 15, as well as an outlet 17, which likewise communicates with the mixing chamber 15. Both the inlet 16 and the outlet 17 pass through the first end bottom 4 of the main housing 2. The mixing chamber 14 is recognizable in the embodiments being shown here in the area of a front side 18 facing the first bottom 4 only in physical contact with the main housing 2, whereas it is otherwise located at a spaced location from the main housing 2, i.e., especially from jacket 3 and from the second end bottom 5. The dimensioning of the mixing housing 14 is preferably adapted to the dimensioning of the main housing 2 such that a deflection area 19 located away from the inlet 16 in the mixing chamber 15 is located farther away from the first end bottom 4 than from the second end bottom 5. In other words, the mixing housing 14 extends from the first end bottom 4 to the second end bottom 5, but preferably without touching this. As a result, mixing chamber 15 assumes a comparatively great length in the axial direction of the especially cylindrical or barrel-shaped main housing 2.

Outlet 17 of the mixing housing 14 opens into a deflecting chamber 20, which can hereinafter be called an additional deflecting chamber 20. Furthermore, at least one inlet 21 of at least one SCR catalytic converter 22 opens into this additional deflecting chamber 20. The respective inlet 21 of the SCR catalytic converter 22 likewise passes through the first end bottom 4. The respective SCR catalytic converter 22 extends otherwise in the interior 23 of the main housing 2. Corresponding to FIG. 1, the exhaust gas-treating device 1 has two such SCR catalytic converters 22 in this example. It is clear that there may also be more or fewer SCR catalytic converters 22. Gas flows through the two SCR catalytic converters 22 in parallel and they open on the outlet side, via a corresponding outlet 24 each, into the interior 23 or into a settling chamber 25 of the main housing 2, which said chamber is formed in the interior 23. Purely as an example, the SCR catalytic converter 22 has two SCR catalytic converters 26 in the example, which are arranged one after the other, i.e., gas can flow through them in series.

Main housing 2 has, in the usual manner, an outlet port 27, which communicates, for example, with the settling chamber 25. In addition, an intermediate bottom 28, which separates in the interior 23 the settling chamber 25 from an absorption chamber 29, which may be filled with a sound-absorbing material 30 in the example, may be arranged in the main housing 2. Intermediate bottom 28 is designed such that it is permeable to air-borne sound. For example, it has a corresponding perforation. In addition, additional sound-absorbing measures may be provided in the exhaust gas-treating device 1.

Main housing 2 is equipped, furthermore, with an inlet port 31, which is connected corresponding to FIG. 3 in the interior 23 via a deflecting shell 32 to an inlet 33 of an oxidation-type catalytic converter 34. The oxidation-type catalytic converter 34 is arranged upstream of the particle filter 7. If a plurality of particle filters 7 are accommodated in the main housing 2, correspondingly many oxidation-type catalytic converters 34 are provided as well, to which exhaust gas is admitted via a common inlet port 31 or via separate inlet ports 31. It is likewise possible to provide a common oxidation-type catalytic converter 34 for a plurality of particle filters 7.

A preferred embodiment and corresponding processes will be discussed in more detail below with respect to FIGS. 4-7. The particle filter 7 correspondingly has an outlet-side end section 35, which faces the deflecting housing 9 and is preferably configured such that it can be integrated into the fastening means 13. The end section 35 is integrated in the fastening means 13 such that axial fixation of the particle filter 7 to the mounting tube 6 or to the inlet 11 of the deflecting housing 9 and hence also axial fixation of the particle filter 7 to the deflecting housing 9 is also formed hereby. By separating the fastening means 13, the axial fixation of the particle filter 7 is eliminated as well, so that the particle filter 7 can be pulled axially out of the mounting tube 6 when the deflecting housing 9 is removed. By mounting the deflecting housing 9 and by fastening the deflecting housing 9 to the main housing 2, the respective particle filter 7 is also fixed at the same time in the relative position intended therefor by means of the fastening means 13.

The fastening means 13 is designed as a clamp connection in the embodiments according to FIGS. 4-6. Contrary to this, FIG. 7 shows a fastening means 13 designed as a screwed flange connection. Corresponding to FIGS. 4-7, the respective fastening means 13 comprises a first mounting flange 36, which is formed at the free end of the respective inlet 11. Furthermore, the fastening means 13 comprises a second mounting flange 37, which is formed at the free outlet end 8 of the respective mounting tube 6. The outlet-side end section 35 of the particle filter 7 has a collar 38, which projects outwardly and extends circumferentially in some segments or preferably in its entirety. In the mounted state shown, this collar 38 is arranged axially between the mounting flanges 36, 37 of the fastening means 13. The fastening means 13 is preferably configured now such that it makes it possible to axially brace the collar 38 between the mounting flanges 36, 37.

The respective fastening means 13 may be equipped with at least one seal 39 in order to improve the gas tightness of the connection made. Exactly one such seal 39, which is axially directly in contact with the two mounting flanges 36, 37, is provided in the example according to FIGS. 4 and 7. The collar 38 is directly in contact with the mounting flanges 36, 37 in these cases. Contrary to this, two such seals 39 are provided in the embodiments according to FIGS. 5 and 6, and the mounting flanges 36, 37 are supported at the collar 38 via one of these seals 39 on sides mutually facing away from one another. Especially advantageous is an embodiment in which the seals 39 are fastened to the collar 38, e.g., by bonding or vulcanization. The respective seal 39 can then also be replaced automatically by changing the particle filter 7. In addition, mounting becomes simpler.

To make it possible to replace the particle filter 7 in a simplified manner, it is preferably equipped with a jacket 41, which has a tubular design and which accommodates at least one particle filter element 42. The particle filter element 42 is enveloped here by means of a mounting mat 43 in the usual manner and is thus positioned in the jacket 41. The aforementioned collar 38 is preferably made integrally in one piece with this jacket 41 of the particle filter 7.

Corresponding to FIG. 3, an inlet-side end section 40 of the particle filter 7, which end section is located away from the deflecting housing 9, can be radially supported at the mounting tube 6 such that the end section 40 is axially displaceable relative to the mounting tube 6. This axial displaceability of the inlet-side end section 40 can be embodied in different ways. A plurality of alternative solutions are shown as examples in FIGS. 8-13. For example, an annular or ring segment-shaped bearing body 44, which can slide on the mounting tube 6, may be fastened to the particle filter 7 or to the jacket 41 thereof corresponding to FIG. 8.

Corresponding to FIGS. 9 and 12, the bearing body 44 may be made elastic and formed, for example, by a collar or pad or wiremesh or mounting mat material, which extents fully circumferentially or extends circumferentially in some segments. This elastic bearing body 44 may be fastened to the particle filter 7 or the jacket 41 thereof corresponding to FIG. 9 and slide on the mounting tube 6. It is likewise possible, corresponding to FIG. 12, to arrange such an elastic bearing body 44 at the mounting tube 6, so that the particle filter 7 or the jacket 41 thereof can slide thereon.

No separate bearing body 14 is used in the embodiments according to FIGS. 10, 11 and 13, but a contour that makes mounting possible is formed directly at the particle filter 7 or at the jacket 41 thereof corresponding to FIG. 10 or directly at the mounting tube 6 corresponding to FIGS. 11 and 13. For example, FIG. 10 shows a cross-section expansion 45, which is formed directly at jacket 41 of particle filter 7 and which may be configured such that it extends fully circumferentially or extends circumferentially in some segments. As can be recognized, this cross-section expansion 45 is supported directly at the mounting tube 6. Contrary to this, a cross-section contraction 46 formed at the mounting tube 6, which is dimensioned such that it comes into direct radial contact with the particle filter 7 or with the jacket 41 thereof, is provided in the embodiments according to FIGS. 11 and 13. This cross section contraction 46 may also extend fully circumferentially or extend circumferentially in some sections. For example, the linear support shown in FIG. 11 indicates a cross section contraction 46 extending in an annular pattern, while the flat support shown in FIG. 13 indicates a cross section contraction 46 extending circumferentially in a punctiform manner or in some segments, which has a plurality of contact areas arranged at spaced locations from one another in the circumferential direction.

FIG. 3 shows another peculiarity of the exhaust gas-treating device 1 shown here. The oxidation-type catalytic converter 34 comprises in the example an oxidation-type catalytic converter element 47, which is arranged in a tubular jacket 48 and is positioned in the corresponding jacket 48 by means of a corresponding mounting mat 49. Jacket 48 of the oxidation-type catalytic converter 34 is axially extended on an outlet side 50 of the oxidation-type catalytic converter 34. This axial outlet-side extension of jacket 48 of the oxidation-type catalytic converter 34 forms the mounting tube 6 in the embodiments being shown here. An extreme simplification and weight reduction is obtained hereby and simple possibility of replacing the particle filter 7 is achieved.

Corresponding to FIG. 3, the outlet 12 of the deflecting housing 9 and the inlet 16 of the mixing housing 14 are connected to one another in a communicating manner. A fastening means 51, which makes it possible to detachably fasten the outlet 12 and the inlet 16 to one another, shall be used for this connection as well. This additional fastening means 51 may be, in principle, of the same design as the aforementioned fastening means 13. Thus, this is preferably also a clamp connection or a screwed flange connection.

Figure 14:
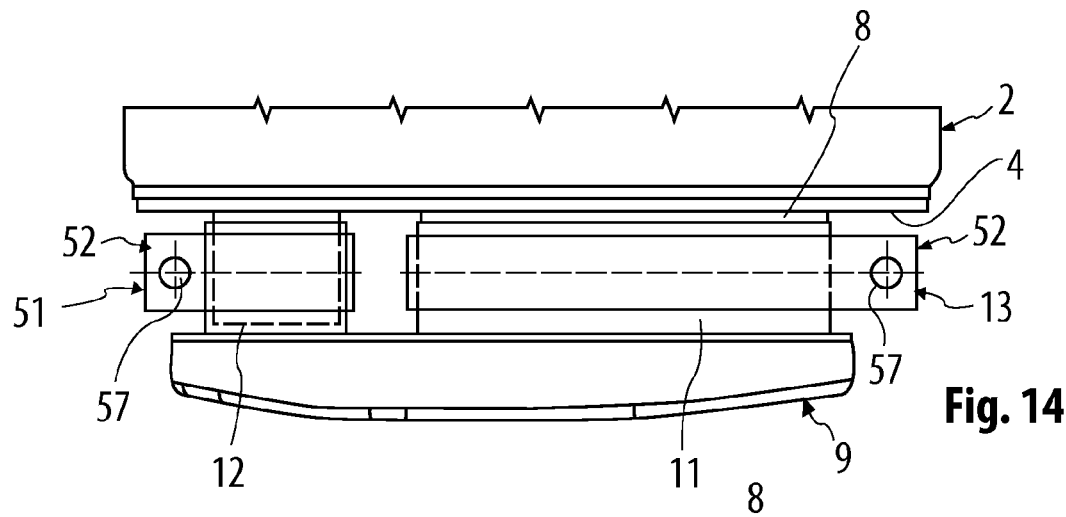
FIG. 14 is a side view of the exhaust gas-treating device in the area of the deflecting housing according to one embodiment.
Figure 15:
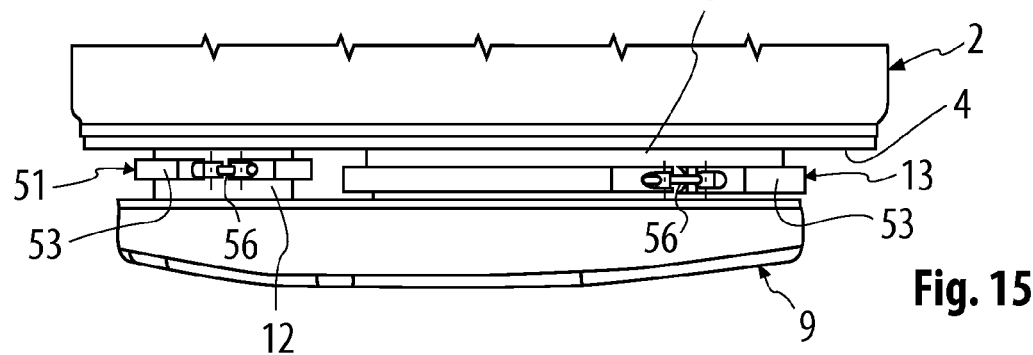
FIG. 15 is a side view of the exhaust gas-treating device in the area of the deflecting housing according to another embodiment.
Figure 16:
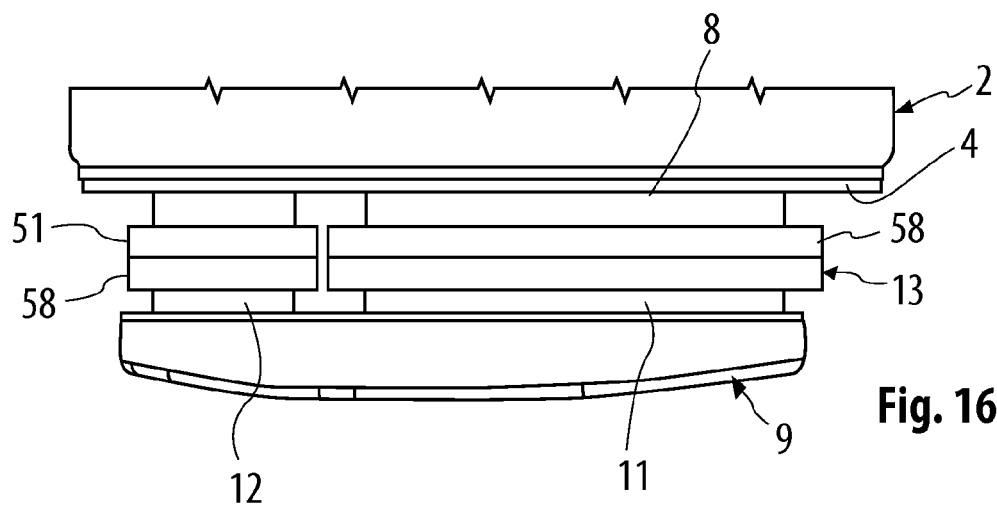
FIG. 16 is a side view of the exhaust gas-treating device in the area of the deflecting housing according to another embodiment.
Figure 17:
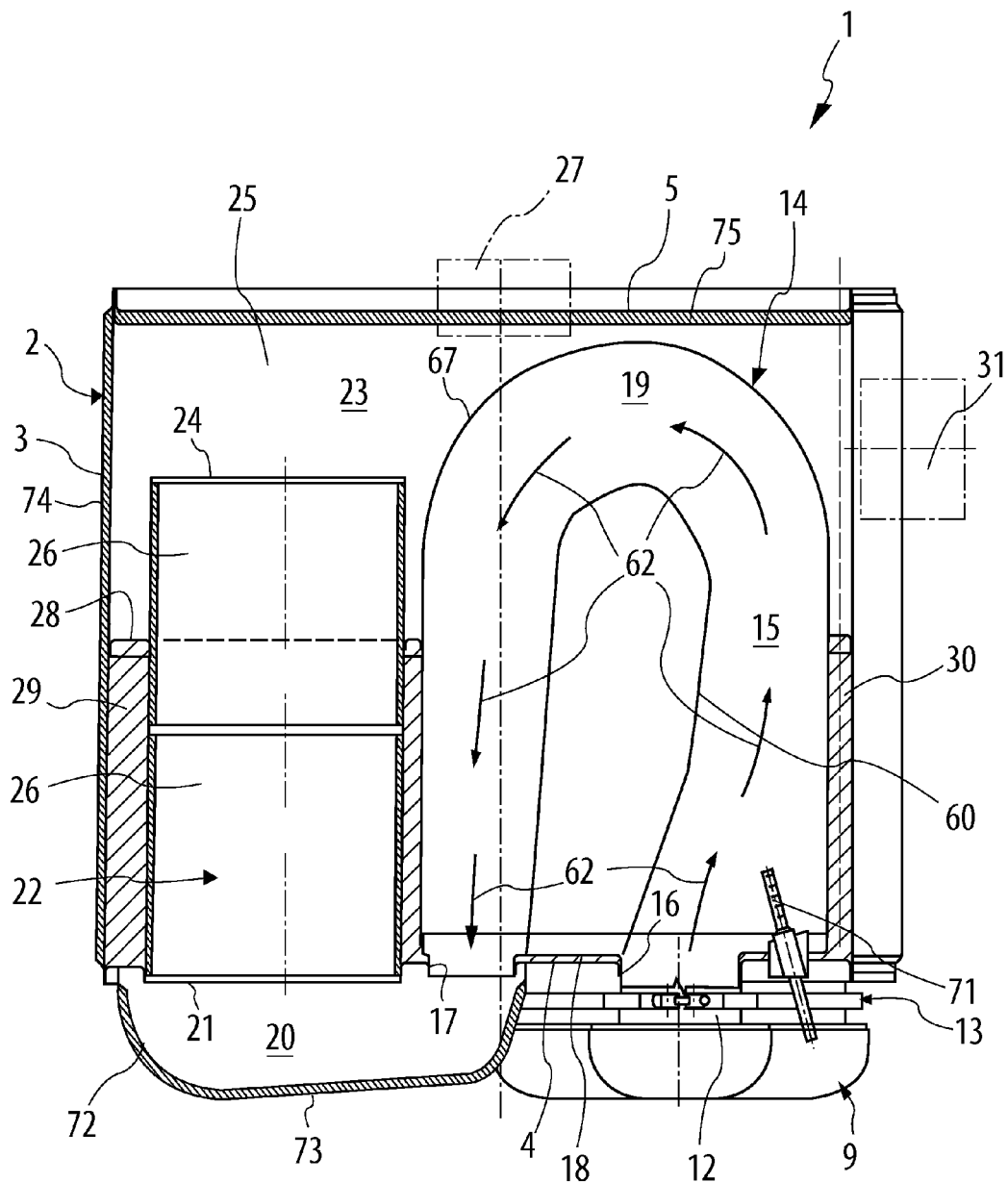
FIG. 17 is a longitudinal section of the exhaust gas-treating device corresponding to section lines XVII in FIG. 1.

FIGS. 14-16 show different embodiments. FIGS. 14 and 15 show a clamp connection each, wherein the respective clamp 52 is designed as a flat clamp 52, which brings about only radial pressing of the tube sections plugged coaxially into one another, namely, between the outlet 8 of the mounting tube 6 and the inlet 11 of the deflecting housing 9, on the one hand, and between the outlet 12 of the deflecting housing 9 and the inlet 16 of the mixing housing 14, on the other hand. An embodiment corresponding to FIG. 15, in which the respective clamp connection 13, 51 is designed as a V clamp 53, is preferred. Such a V clamp 53 can be equipped corresponding to FIGS. 4-6 with a circumferential tensioning band 54 as well as with a V-section 55, as a result of which axial pressing of the mounting flanges 36, 37 can be achieved by means of such a V clamp 53, which can also be called a V-band clamp. FIG. 15 indicates tightening means 56, which make it possible to tighten the respective clamp 53 in the usual manner. Contrary to this, FIG. 14 shows for the respective clamp 52 only an area 57, which is intended for arranging a suitable tightening means.

Finally, FIG. 16 shows an embodiment in which the respective fastening mans 13, 51 is designed as a screwed flange connection 58. Corresponding screws 59 can be recognized in FIG. 7. It can be determined from FIGS. 14-16 that the fastening means 13, 51 operating with V-clamps 53 have an especially compact design in the axial direction. FIG. 3 indicates that the two fastening means 13, 51 do not necessarily have to be of identical design. Thus, the fastening means 13 associated with the particle filter 7 is designed as a V-clamp 53, whereas the fastening means 51 associated with the mixing housing 14 is designed as a flat clamp 52 here as an example.

Corresponding to FIGS. 17-23 and partly corresponding to FIGS. 24-29, at least one guide wall 60 may be arranged in the mixing housing 14. The embodiments according to FIGS. 17 and 20-23 show only a single guide wall 60 each, whereas the embodiments according to FIGS. 18 and 19 additionally have another guide wall 61. The respective guide wall 60, 61 forms within the mixing chamber 15 a mixing section 62, which is indicated by arrows in FIGS. 17-23. However, simple embodiments which make do without a guide wall 60, 61 are conceivable as well.

Figure 24:
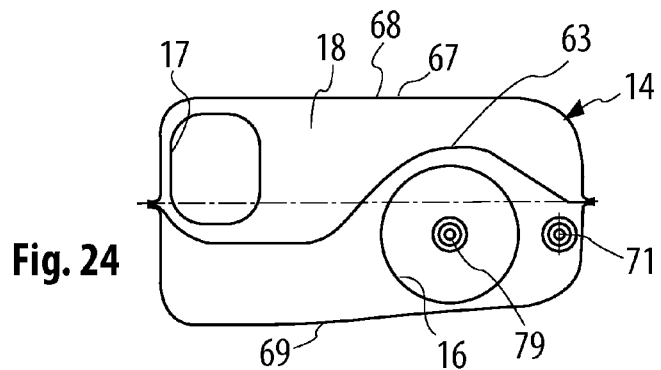
FIG. 24 is an axial view of the mixing housing corresponding to the embodiment according to FIG. 18.
Figure 18:
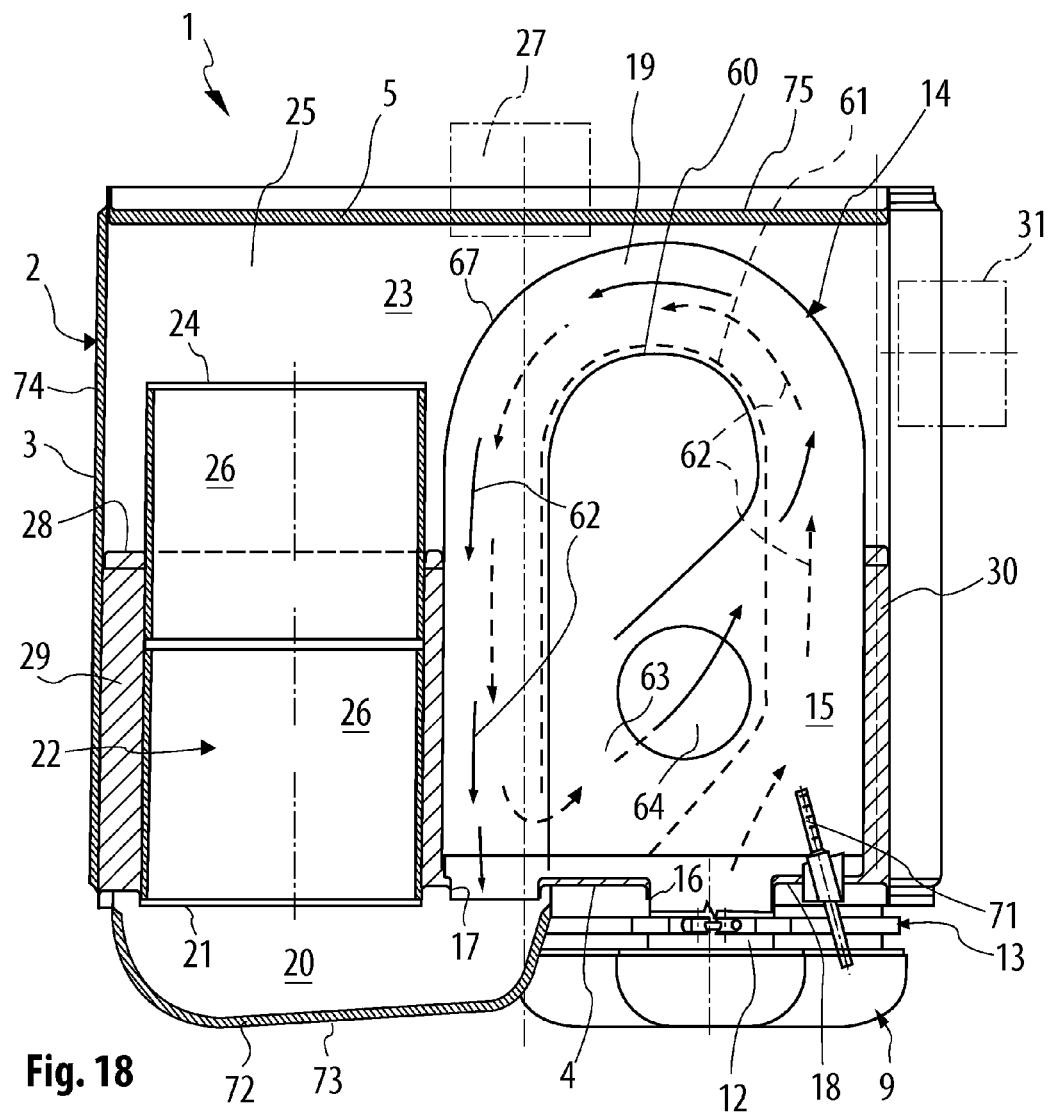
FIG. 18 is a sectional view as in FIG. 17, but showing a different embodiment of a mixing housing.
Figure 25:
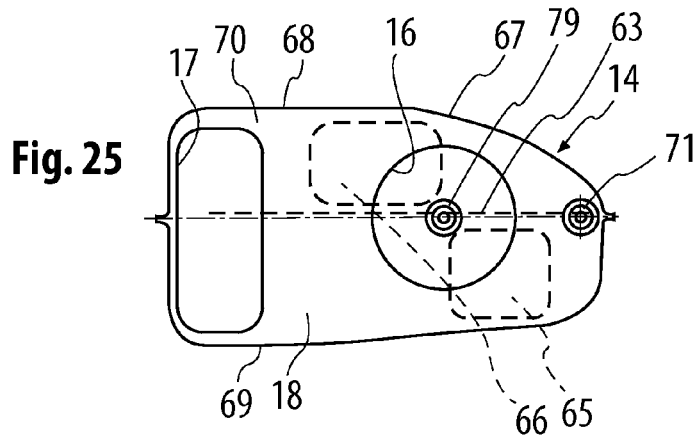
FIG. 25 is an axial view of the mixing housing corresponding to the embodiment according to FIG. 19.
Figure 19:
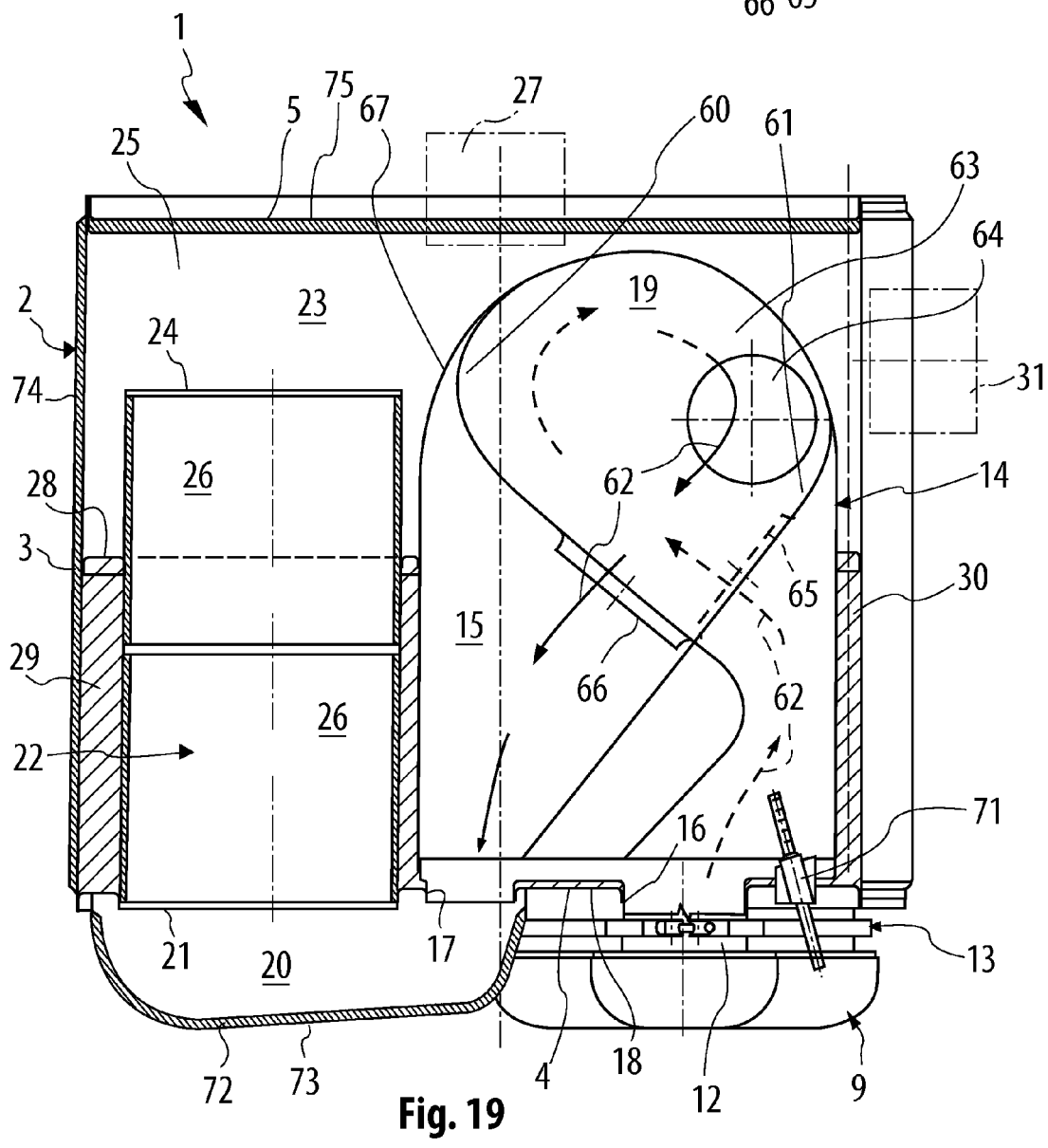
FIG. 19 is a sectional view as in FIG. 17, but showing another different embodiment of the mixing housing.
Figure 26:
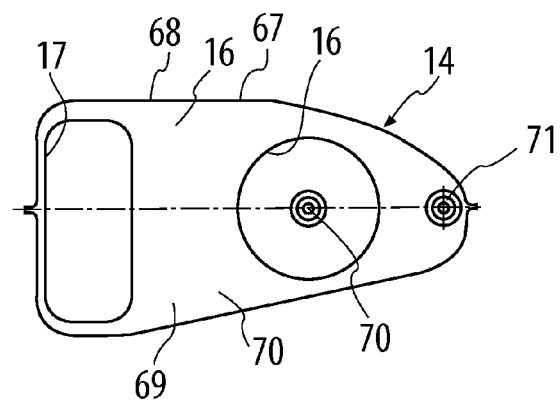
FIG. 26 is an axial view of the mixing housing corresponding to the embodiment according to FIG. 20.

In addition, an intermediate wall 63, which can be better recognized in the corresponding side views in FIGS. 24 and 25, respectively, is arranged in the mixing housing 14 in the embodiments according to FIGS. 18 and 19. The respective intermediate wall 63 separates two planes within the chamber 15. The mixing section 62 extends through both planes. A section of the mixing section 62, which extends in the plane facing away from the viewer, is indicated for illustration by arrows drawn in broken line, while a section of the mixing section 62, which is located in the plane facing the viewer, is indicated by arrows drawn in solid line. As can be recognized, comparatively complex mixing sections 62 can be embodied. In any case, the exhaust gas flow is passed through the mixing housing 14 such that at least one deflection of 180° becomes established between a flow direction at the inlet 16 and a flow direction at the outlet 17. Even a flow deflection by more than 180° is readily achieved in the embodiments according to FIGS. 18 and 19. The exhaust gas flow is deflected by 180° three times i.e., by a total of about 540°, in the embodiment according to FIG. 18. Flow deflection by at least 360° or at least 450° is achieved in the embodiment according to FIG. 19.

Figure 20:
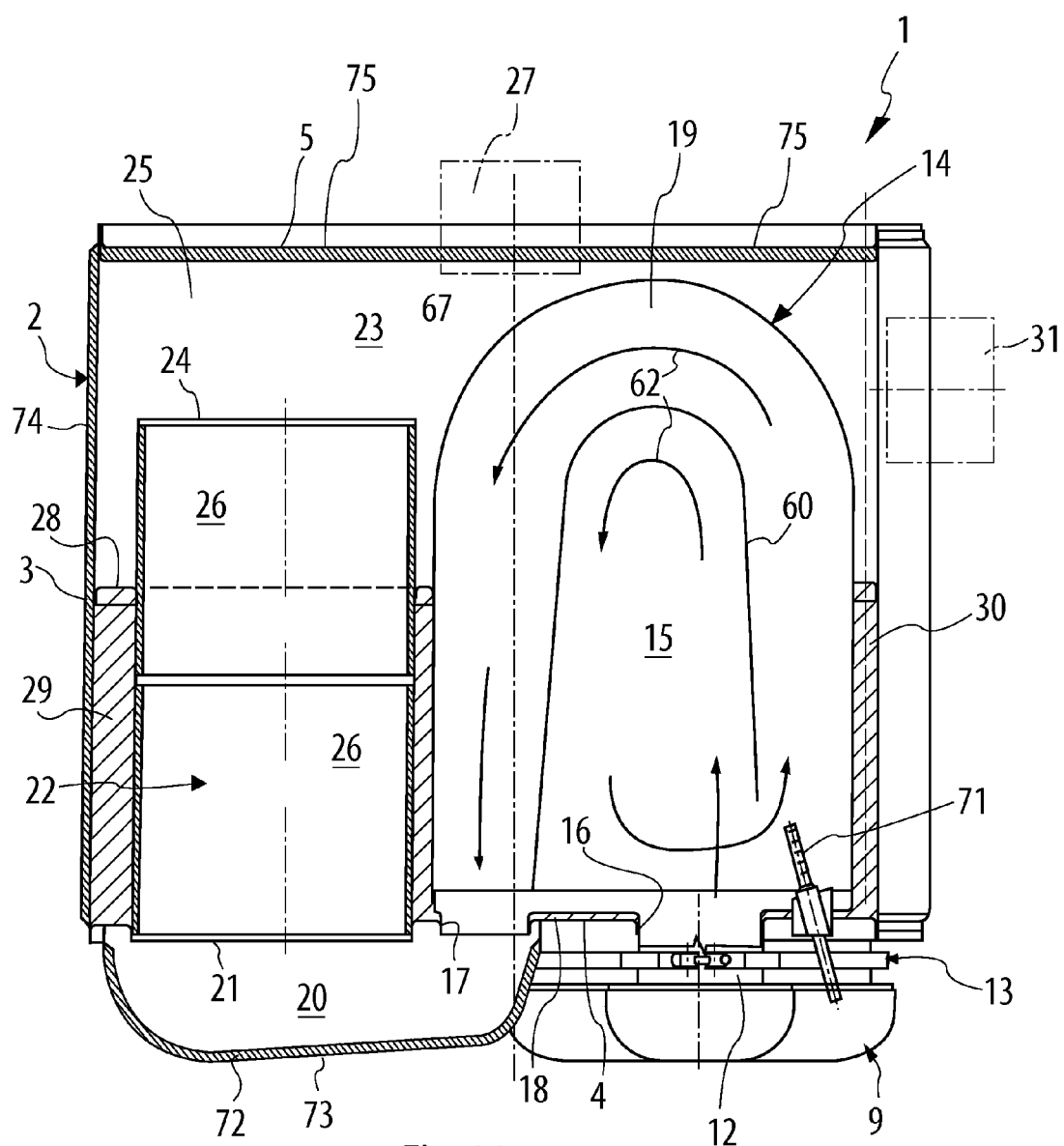
FIG. 20 is a sectional view as in FIG. 17, but showing another different embodiment of the mixing housing.
Figure 27:
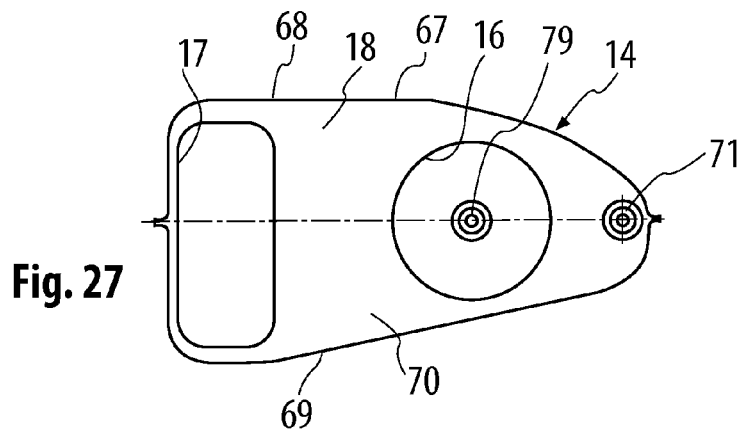
FIG. 27 is an axial view of the mixing housing corresponding to the embodiment according to FIG. 21.
Figure 21:
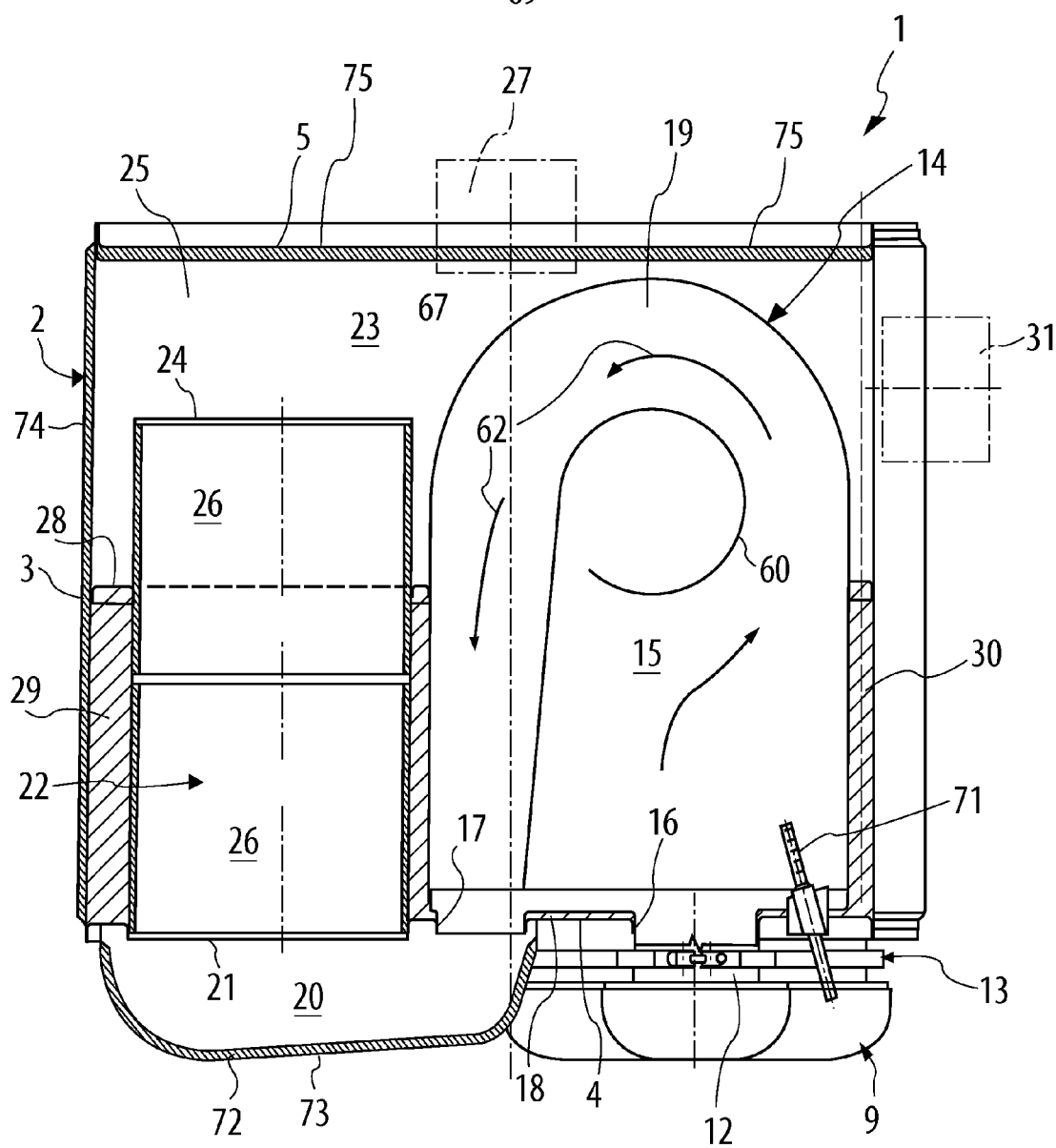
FIG. 21 is a sectional view as in FIG. 17, but showing another different embodiment of the mixing housing.
Figure 28:
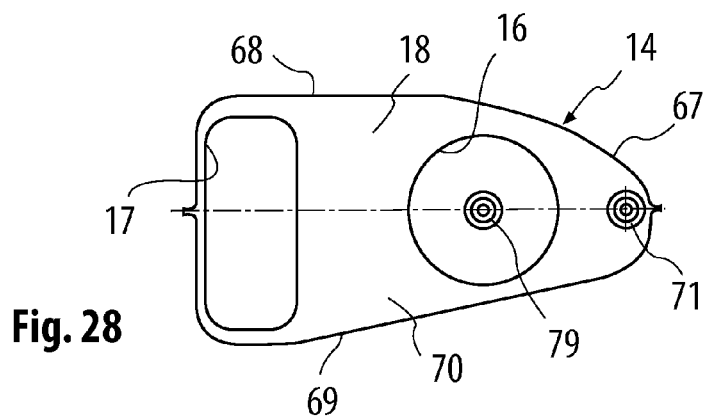
FIG. 28 is an axial view of the mixing housing corresponding to the embodiment according to FIG. 22.
Figure 22:
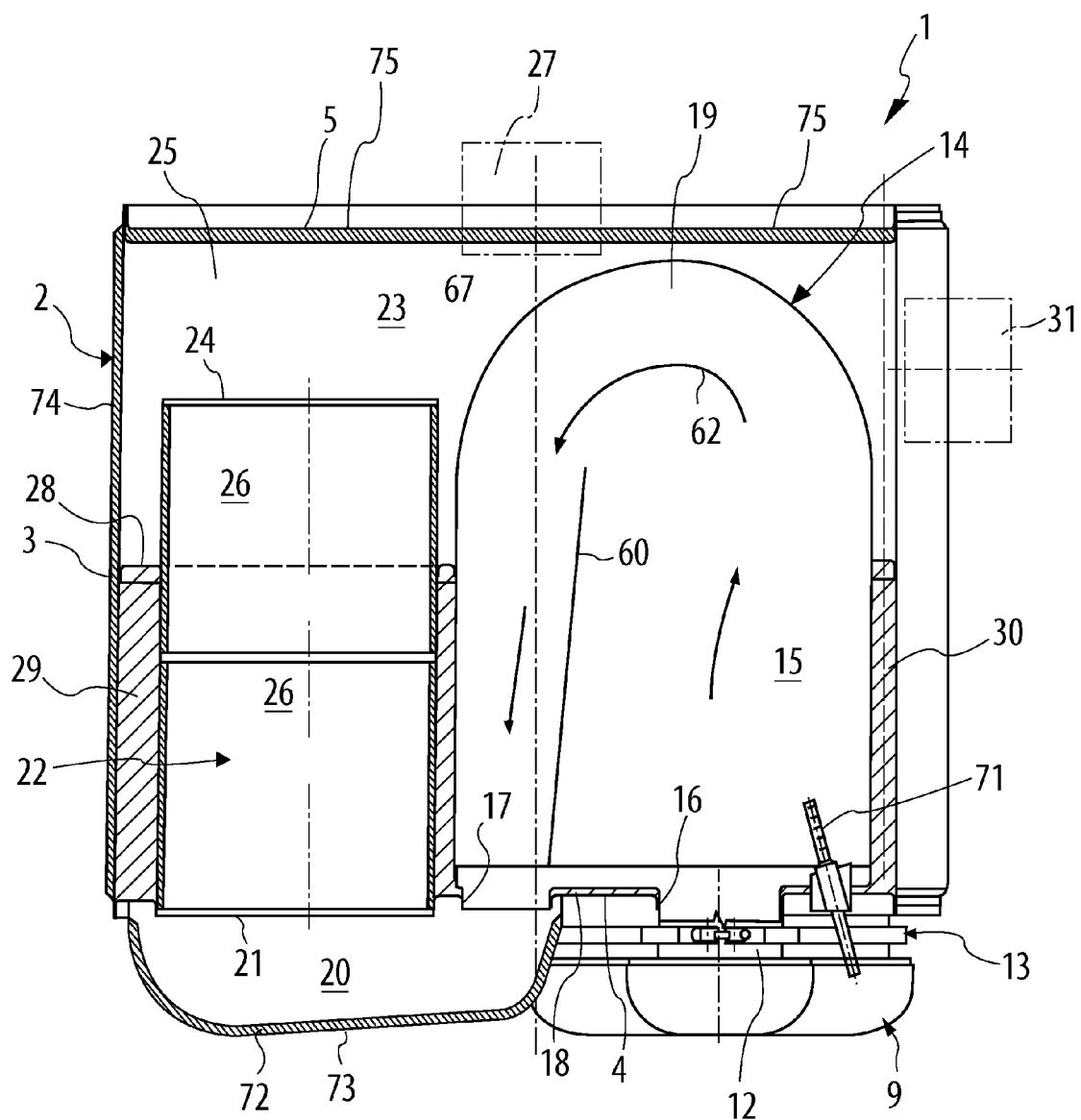
FIG. 22 is a sectional view as in FIG. 17, but showing another different embodiment of the mixing housing.
Figure 29:
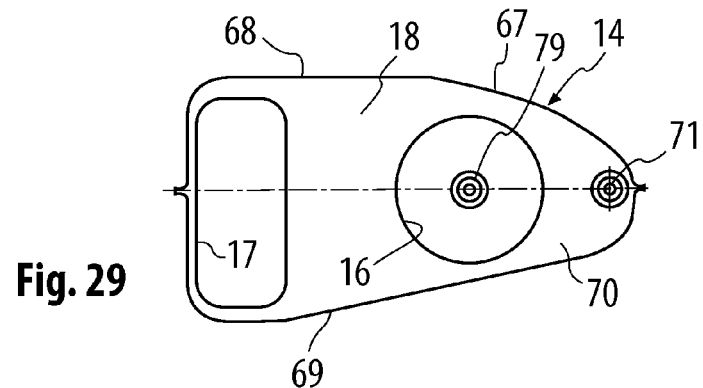
FIG. 29 is an axial view of the mixing housing corresponding to the embodiment according to FIG. 23.
Figure 23:
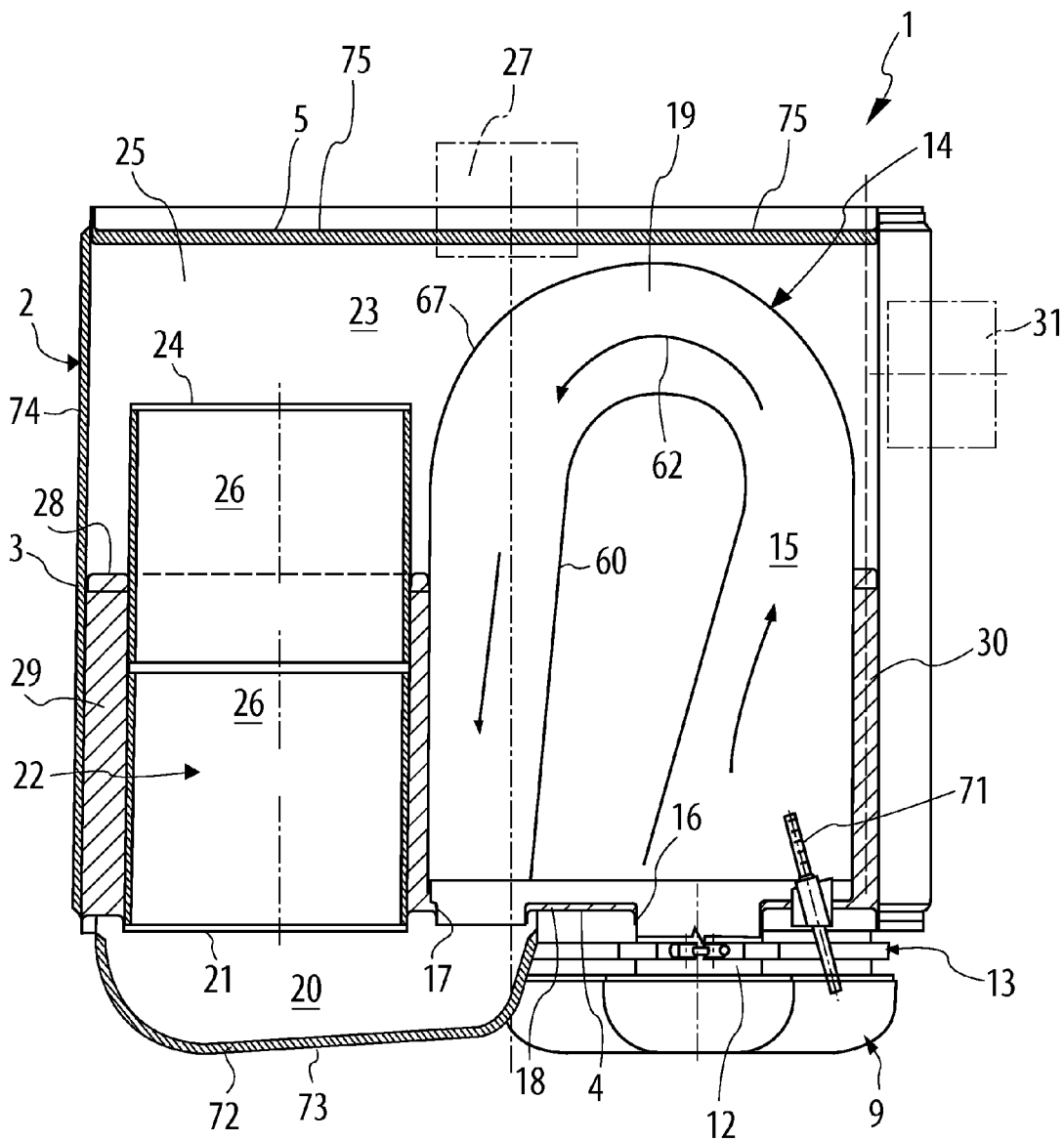
FIG. 23 is a sectional view as in FIG. 17, but showing another different embodiment of the mixing housing.

The configuration shown in FIG. 20, which makes do without an intermediate wall 63, also leads to a flow deflection by about 540°.

The intermediate wall 63 shown in the embodiments according to FIGS. 18 and 19 has at least one passage opening 64, through which the exhaust gas proceeds from one plane to the other plane along the mixing section 62. The mixing housing 14 is preferably designed here such that inlet 16 communicates with one plane while the outlet 17 is communicatingly connected to the other plane. The two guide walls 60, 61 are equipped with a respective connection opening 65 and 66 in the embodiment shown in FIG. 19. The guide walls 60, 61 are arranged in these embodiments within the mixing chamber 15 such that they divide the mixing section 62 into a plurality of sectors. The aforementioned connection openings 65, 66 now make possible a communicating connection of consecutive sectors. The flow guiding can be improved hereby and the mixing section 62 can be extended with simple means. It is clear that the mixing chamber 14 can also make do without a guide wall 60, 61 and without an intermediate wall 63 in a simple embodiment.

The mixing housing 14 is made gas-tight against the interior space 23 of the main housing 2. The main housing 2 can consequently be made of less expensive materials. Furthermore, leakage can be tolerated in the main housing 2, so that the manufacture of the main housing 2 can also be carried out at a lower cost.

In the embodiments being shown here the mixing housing 14 has a housing body 67. Housing body 67 has a front side 18, already mentioned above, which faces the first end bottom 4 of the main housing 2. This front side 18 has the inlet 16 and the outlet 17 of the mixing housing 14. Corresponding to the preferred embodiments being shown here, inlet 16 is designed as an inlet pipe connection, which passes through an inlet opening, not designated more specifically, of the first end bottom 4 of the main housing 2. The inlet opening may be provided as an example with an outwardly projecting collar extending circumferentially in an annular pattern. Analogously hereto, outlet 17 may be designed as an outlet pipe connection, which passes through an outlet opening, not designated more specifically, of the first end bottom 4 of the main housing 2. This outlet opening may also be provided with an outwardly projecting collar extending circumferentially in an annular pattern. The pipe connections preferably extend in parallel to one another.

The housing body 67 may preferably be designed as a monocoque construction and have an upper shell 68 and a lower shell 69 according to the views in FIGS. 24-29. Furthermore, a front shell 70 forming the front side 18 may be provided as an additional component. The mixing housing 14 can be manufactured and made gas-tight at an especially low cost due to the mode of construction being proposed.

The exhaust gas-treating device 1 shown here is equipped corresponding to FIGS. 17-23 as well as 24-29 with at least one dosing means 71, by means of which a liquid educt, namely, preferably a reducing agent, can be introduced into the mixing chamber 15. For example, ammonia or urea or an aqueous urea solution can be mixed with the exhaust gas flow upstream of the SCR catalytic converter 22. The dosing means 71 is preferably positioned for this such that the reducing agent is introduced quasi at the beginning of the mixing section 62. The dosing means 71 is preferably positioned such that it can introduce the reducing agent into the mixing chamber 15 in the area of the inlet 16 of the mixing housing 14. The dosing means 71 is preferably arranged at the first end bottom 4, namely, such that it passes through this first end bottom 4 as well as the mixing housing 14. The dosing means 71 is positioned in the example such that it passes through the front side 18 or the front shell 70 of the housing body 68.

Figure 30:
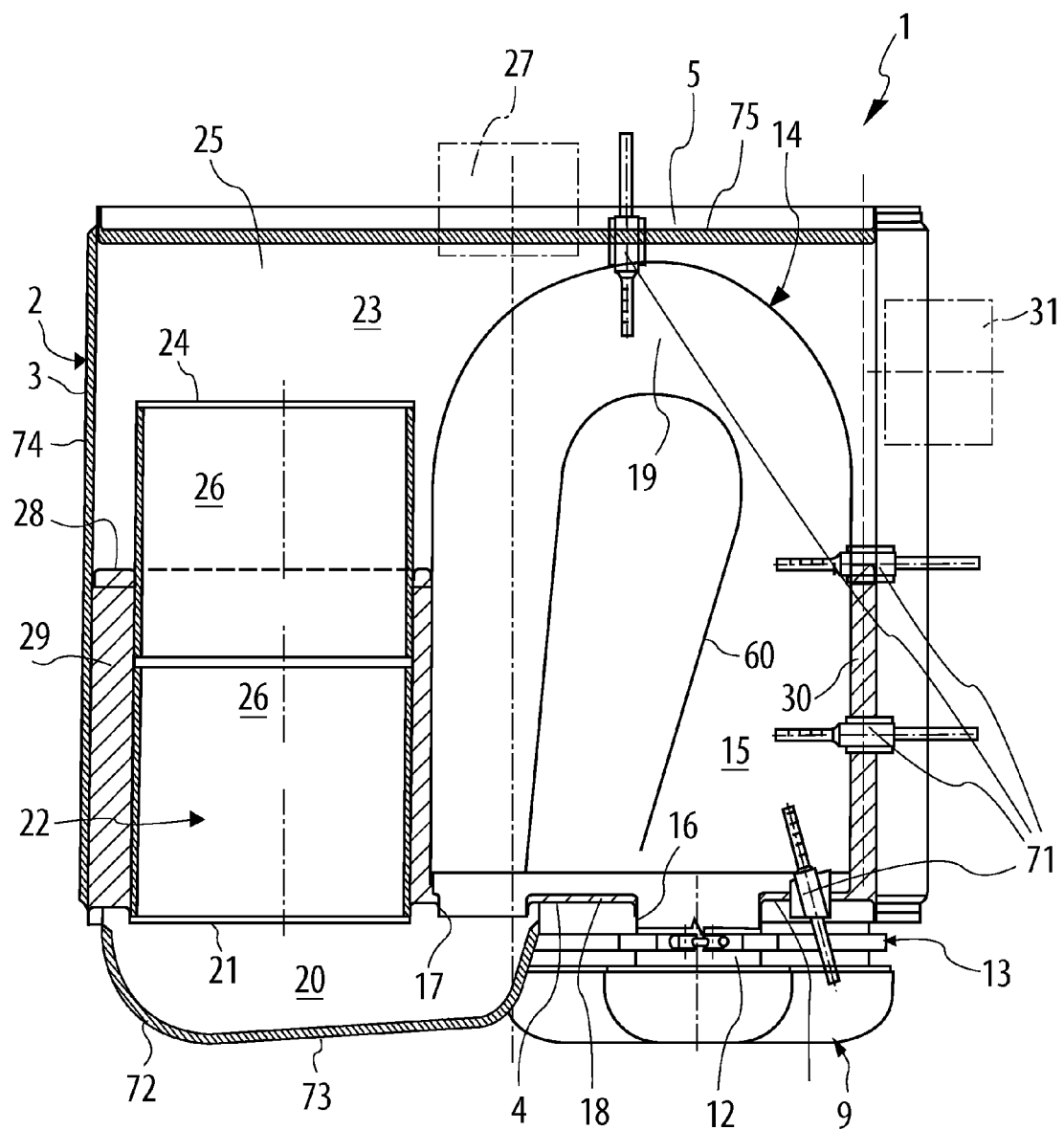
FIG. 30 is another sectional view as in FIGS. 17-23 for illustrating various installation positions of a dosing means.

Basically, the arrangement or positioning of the dosing means 71 in relation to the mixing housing 14 can be selected quasi as desired. FIG. 30 therefore shows as an example additional positions, which are suitable for the arrangement of such a dosing means.

To embody the additional deflecting chamber 20, a deflecting shell 72 may be arranged at the first end bottom 4. Together with an area of the first end bottom 4 covered by the deflecting shell 72, the deflecting shell 72 defines the additional deflecting chamber 20. Corresponding to FIG. 1, this deflecting shell 72 is dimensioned such that it covers the outlet 17 of the mixing housing 14 as well as the respective inlet 21 of the respective SCR catalytic converter 22.

Deflecting shell 72 has a double-walled design in the example, which can be used to embody an air gap insulation. A thermally insulating insulating material 73 may likewise be introduced into the double wall of the deflecting shell 72. Jacket 3 of the main housing 2 may be of a double-walled design. This can be used to embody an air gap insulation or to introduce a thermally insulating insulating material 74. The second end bottom 5 may of a double-walled design for an air gap insulation or for receiving a thermally insulating insulating material 75.

Corresponding to FIG. 3, the deflecting housing 9 comprises a pot-shaped shell body 76 and a cover or bottom 77, between which the deflecting chamber 10 is defined. The cover or bottom 77 has the respective inlet 11 and the respective outlet 12. Shell body 76 is of as double-walled design in the example shown in FIG. 3 and may correspondingly form an air gap insulation or, like here, a mounting space for accommodating a thermally insulating insulating material 78.

Corresponding to FIG. 3 as well as corresponding to FIGS. 24-29, a dosing means 79 or an additional dosing means 79, by means of which a liquid educt, especially a reducing agent, can be likewise introduced into the exhaust gas flow, may be provided as an alternative or in addition to the aforementioned dosing means 71. This additional dosing means is arranged at the deflecting housing 9 here, namely, such that it can introduce the corresponding educt in the direction of the inlet 16 of mixing housing 14. The dosing means 79 belongs in this case to the construction volume of the deflecting housing 9. The path to the inlet 16 or through the inlet 16 to the mixing section 15 or to the mixing section 62 is additionally added in this configuration in order to further extend this.

While specific embodiments of the invention have been described in detail to illustrate the application of the principles of the invention, it will be understood that the invention may be embodied otherwise without departing from such principles.

What is claimed is:

1. An exhaust gas-treating device for an exhaust system of a motor vehicle internal combustion engine, the exhaust gas-treating device comprising:
   a housing with a circumferentially extending jacket, a first axial end side connected to the jacket at a first axial end of said housing, and a second axial end side connected to the jacket at a second axial end of said housing;
   a first tube extending through said first end side, said first tube having an end arranged spaced from said housing and said first end side;
   a second tube extending through said first end side, said second tube having an end arranged spaced from said housing and said first end side, said second tube being separate from said first tube;
   a deflecting housing defining a deflecting chamber, said deflecting housing having an inlet communicating with said deflecting chamber and an outlet communicating with said deflecting chamber;
   a first fastening means for detachably fastening said inlet of said deflecting housing to said end of said first tube;
   a second fastening means for detachably fastening said outlet of said deflecting housing to said end of said second tube.

2. An exhaust gas-treating device in accordance with claim 1, further comprising:
   a third tube arranged in said housing, said third tube having two ends, one of said ends being arranged inside said housing;
   a deflecting shell connected to another end of said second tube and another one of said ends of said third tube, said deflecting shell being arranged at said first axial end of said housing.

3. An exhaust gas-treating device in accordance with claim 2, wherein:
   an interior space is defined between an inside of said housing, and an outside of said first, second and third tubes;
   said housing, said first, second and third tubes, said deflecting housing, and said deflecting shell form a flow path that extends sequentially from said first tube though said deflecting housing, said second tube, said deflecting shell, said third tube, and ends in said interior space of said housing.

4. An exhaust gas-treating device in accordance with claim 3, further comprising:
   a particle filter arranged in one of said first and second tubes.

5. An exhaust gas-treating device in accordance with claim 4, wherein:
   said particle filter is arranged slidable into and out of said end of said one of said first and second tubes.

6. An exhaust gas-treating device in accordance with claim 3, further comprising:
   a mixing chamber and catalytic converter arranged in said housing between said first and second ends of said housing.

7. An exhaust gas-treating device in accordance with claim 4, further comprising:
   a mixing chamber and catalytic converter arranged in said housing between said first and second ends of said housing.

8. An exhaust gas-treating device in accordance with claim 5, further comprising:
   a mixing chamber and catalytic converter arranged in said housing between said first and second ends of said housing.

* * * * *